US008726249B2

(12) United States Patent
Gu et al.

(10) Patent No.: US 8,726,249 B2
(45) Date of Patent: May 13, 2014

(54) BOOTUP METHOD AND DEVICE FOR APPLICATION PROGRAM IN MOBILE EQUIPMENT

(75) Inventors: Youpeng Gu, Shenzhen (CN); Lifeng Xu, Shenzhen (CN); Wei Hu, Shenzhen (CN); Sheng Zhong, Shenzhen (CN); Wei Wang, Shenzhen (CN); Zemin Wang, Shenzhen (CN)

(73) Assignee: ZTE Corportaion, Shenzhen, Guangdong (CN)

(*) Notice: Subject to any disclaimer, the term of this patent is extended or adjusted under 35 U.S.C. 154(b) by 47 days.

(21) Appl. No.: 13/575,550

(22) PCT Filed: Feb. 21, 2011

(86) PCT No.: PCT/CN2011/071142
§ 371 (c)(1),
(2), (4) Date: Jul. 26, 2012

(87) PCT Pub. No.: WO2012/045238
PCT Pub. Date: Apr. 12, 2012

(65) Prior Publication Data
US 2012/0304166 A1    Nov. 29, 2012

(30) Foreign Application Priority Data
Oct. 9, 2010   (CN) .......................... 2010 1 0504978

(51) Int. Cl.
*G06F 9/45*   (2006.01)
(52) U.S. Cl.
USPC ............ 717/148; 717/149; 717/150; 717/151
(58) Field of Classification Search
None
See application file for complete search history.

(56) References Cited

U.S. PATENT DOCUMENTS

| 6,779,188 | B1 | 8/2004 | Blandy |
| 2004/0210865 | A1 | 10/2004 | Shimura |
| 2009/0055821 | A1* | 2/2009 | Grcevski et al. ................... 718/1 |
| 2009/0222798 | A1* | 9/2009 | Iguchi et al. ................... 717/137 |

FOREIGN PATENT DOCUMENTS

| CN | 100354826 C | 12/2007 |
| CN | 101957770 A | 1/2011 |
| EP | 1445695 A1 | 8/2004 |
| JP | 2002073345 A | 3/2002 |
| JP | 2005284729 A | 10/2005 |

OTHER PUBLICATIONS

International Search Report dated Jul. 7, 2011, as issued in corresponding to international application No. PCT/CN2011/071142, mailed on Jul. 7, 2011.
English Translation of the Written Opinion of the International Search Authority in international application No. PCT/CN2011/071142, mailed on Jul. 7, 2011.
Supplementary European Search Report in European application No. 11830194.4, mailed on Oct. 7, 2013.

* cited by examiner

*Primary Examiner* — Isaac Tecklu
(74) *Attorney, Agent, or Firm* — Maier & Maier, PLLC

(57) ABSTRACT

A bootup device and method for an application program on a mobile equipment to improve the bootup speed of the application program on the mobile equipment. The bootup device has an application management module, that boots up a virtual machine module based on the application program to be run. A virtual machine module, loads codes of the application program and Just in Time (JIT) compilation results of a bootup process of the application program into a memory, search, in the JIT compilation results, for local JIT compiled codes corresponding to the bootup process code segment to be executed, and executes the found local JIT compiled codes when executing each bootup process code segment of the application program. A storage management module, store and reads the codes of the application program and the JIT compilation results obtained from the JIT compilation of the bootup process of the application program.

22 Claims, 3 Drawing Sheets

Fig. 1

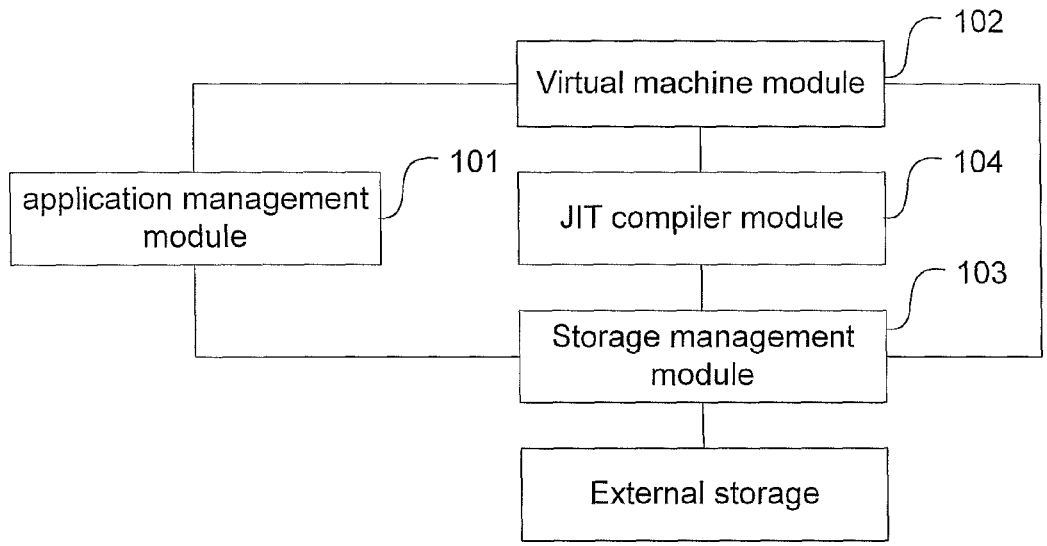

Fig. 2

S201: The application management module boots up, based on the Java application program to be run, a Java virtual machine module and controls the Java virtual machine module to execute codes of the Java application program

S202: The virtual machine module calls the storage management module to respectively load the codes of the application program and Just-in-Time (JIT) compilation results of the bootup process of the application program into a memory, searches, in the JIT compilation results, for local JIT compiled codes corresponding to the bootup process code segment to be executed, and executes the found local JIT compiled codes when executing the bootup process code segment of each application program

BOOTUP METHOD AND DEVICE FOR APPLICATION PROGRAM IN MOBILE EQUIPMENT

RELATED APPLICATIONS

This is the U.S. national stage application which claims priority under 35 U.S.C. §371 to International Patent Application No. PCT/CN2011/071142, filed Feb. 21, 2011, which claims priority to Chinese Patent Application No. 201010504978.3, filed Oct. 9, 2010, the disclosures of which are incorporated by reference herein their entireties.

TECHNICAL FIELD

The present disclosure relates to the field of communication, in particular to a bootup method and a bootup device for an application program in a mobile equipment.

BACKGROUND

With the arrival of 3G and smart phone era, there are more and more application programs on a mobile equipment such as a mobile phone. The pattern in which a user uses application programs on a mobile equipment such as a mobile phone is characterized of frequent bootup and short-time usage, which poses stringent requirements on bootup speed of application programs. If the bootup speed of application programs is too low, the time that a user spends on waiting for an application program to boot up may be comparable with or even more than the time that a user spends actually using the application program, which significantly decreases the user experience of a mobile equipment such as a mobile phone.

For example, application programs currently used on common mobile equipments and developed with Java language. Which may be called Java application programs, have the advantages of high portability, one-time compilation running, low development difficulty, high development efficiency, low development cost, and the like. As Java language is an interpreted language with low execution efficiency, Java application programs will encounter a serious problem of low bootup speed.

At present, there are many methods for increasing the bootup speed of Java application programs, wherein one method is that a Java application program is optimized according to its own processing logic, where measures such as lazy load and lazy initialization are taken to accelerate the bootup speed, the effectiveness of such a method is only applicable to a single Java application program itself, and the measures taken are closely related to the features of the Java application program; Another method is that, in the mobile phone software platform, the bootup speed of a Java application program is accelerated with measures such as pre-bootup, pre-load, pre-initialization, Copy-On-Write (COW), caching of application programs on exit, etc; such a method can accelerate bootup speed of all Java application programs without the need to make any modification on the activities.

As the bottleneck of the bootup speed of Java application programs is that Java application programs are interpretively executed, existing methods do not produce satisfactory results in increasing the bootup speed of Java application programs. JIT (Just in Time) is a just-in-time compilation mechanism which compiles Java codes into a local language before execution to avoid interpretive execution, so that the bootup speed of Java application programs is significantly increased. However, the existing JIT will compile codes in Java application programs into a local language before execution only when the codes are executed for a certain number of times; in addition, the results of a JIT compilation are abandoned as a Java application program exits, and no JIT compilation result is available on rerun of a Java application program, which then has to be recompiled during the rerun. As the bootup process of an application is executed once only on bootup of the application program, the bootup process of a Java application program cannot be accelerated by JIT. Because JIT will not compile codes that are executed only once, and while the bootup of a Java application program is the initial stage of rerun of a Java application program, no JIT compilation result will be available for execution either. Therefore, JIT in state of the art is unable to increase the bootup speed of a Java application program. Similarly, application programs on a mobile equipment that are developed with other interpretive languages with the JIT compilation mechanism will also encounter the same problem.

Therefore, the question of how to utilize JIT to increase the bootup speed of a application program has become one of the problems in state of the art that are pressing for answers.

SUMMARY

Therefore, the disclosure discloses a bootup method and a bootup device for an application program on a mobile equipment, which can increase the bootup speed of an application program on a mobile equipment.

To realize the above purpose, the technical solution of the disclosure is implemented as follows:

the disclosure provides a bootup device for an application program in a mobile equipment, including: an application management module, a virtual machine module, and a storage management module; wherein the application management module is configured to boot up a virtual machine module to run based on an application program to be run, and control the virtual machine module to execute codes of the application program;

the virtual machine module is configured to call the storage management module to respectively load the codes of the application program and Just in Time (JIT) compilation results of a bootup process of the application program into a memory, and search for, in the JIT compilation results, local JIT compiled codes corresponding to the code segment of the bootup process to be executed and execute the found local JIT compiled codes in execution of a code segment of the bootup process of the application program;

the storage management module is configured to store and read the codes of the application program and the JIT compilation results obtained from JIT compilation of the bootup process of the application program, wherein the JIT compilation results include JIT compiled codes corresponding to a JIT compiled code segment of the bootup process.

The disclosure further provides a bootup method for an application program on a mobile equipment, including:

booting up, by an application management module, a virtual machine module based on the application program to be run and controlling the virtual machine module to execute codes of the application program;

calling, by the virtual machine module, a storage management module to respectively load the codes of the application program and Just in Time (JIT) compilation results of a bootup process of the application program into a memory, and searching for, in the JIT compilation results, local JIT compiled codes corresponding to a code segment of the bootup process to be executed and executing the found local JIT compiled codes in execution of the code segment of the bootup process of the application program.

According to the bootup device and method for an application program in a mobile equipment provided by embodiments of the disclosure, during the bootup of an application program, the application management module boots up a virtual machine module according to an application program to be run; the virtual machine module calls the storage management module to respectively load the application program codes and a JIT compilation results of the bootup process of the application program into a memory, searches in the JIT compilation results for local JIT compiled codes corresponding to the bootup process code segment to be executed, and executes the found local JIT compiled codes during execution of each bootup process code segment of the application program; Thus, on bootup of an application program, as the JIT compilation results of the bootup process code segment, which is to be executed currently, of the bootup process of the application program is saved, it only requires to directly execute corresponding JIT local compilation results instead of without the need to interpretively execute the bootup process code segment to be executed, therefore increasing the bootup speed of the application program.

BRIEF DESCRIPTION OF THE DRAWINGS

FIG. 1 illustrates a structure diagram of a bootup device for an application program on a mobile equipment in embodiments of the disclosure;

FIG. 2 illustrates a flow diagram of a bootup method for an application program on a mobile equipment in embodiments of the disclosure;

DETAILED DESCRIPTION

Figure 3:
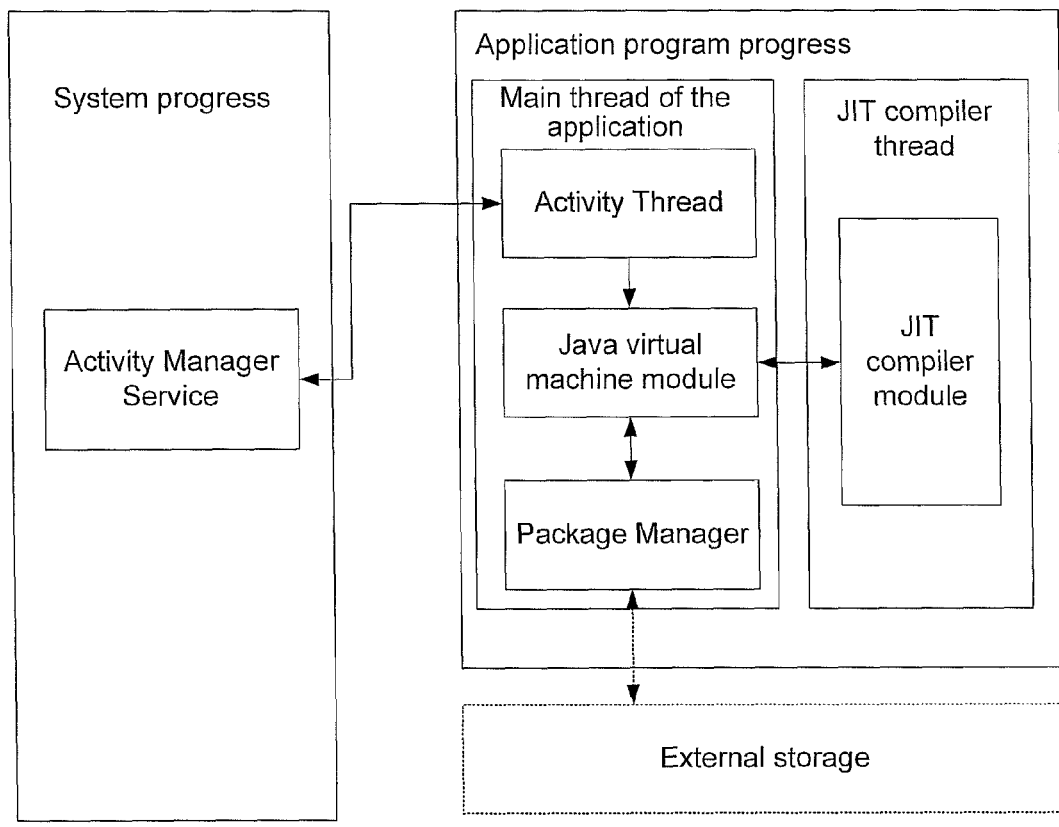
FIG. 3 illustrates a logic structure diagram of a bootup device for a Java application program on an Android mobile phone software platform in embodiments of the disclosure.

The basic conception of the disclosure is that: an application management module is configured to boot up a virtual machine module based on an application program to be run; the virtual machine module is configured to load the application program codes and JIT compilation results of the bootup process of the application program into a memory, search in the JIT compilation results for local JIT compiled codes corresponding to the bootup process code segment to be executed, and execute the found local JIT compiled codes in execution of each bootup process code segment of the application program; a storage management module is configured to store and read application program codes and the JIT compilation results obtained from the JIT compilation of the bootup process of the application program.

In order to increase the bootup speed of an application program on a mobile equipment, the embodiments of the disclosure provide a bootup device and method for an application program on a mobile equipment.

The preferred embodiments of the disclosure will be described below with reference to drawings in the specification. It should be understood that, the preferred embodiments described herein are only used for describing and explaining the disclosure but not for limiting the disclosure, and embodiments in the disclosure and features in the embodiments may be combined with each other as long as such combination does not lead to any conflict.

FIG. 1 illustrates a structure diagram of a bootup device for an application program on a mobile equipment in embodiments of the disclosure; as shown in FIG. 1, the bootup device for an application program on a mobile equipment comprises an application management module 101, a virtual machine module 102, and a storage management module 103; wherein, the application management module 101 is configured to boot up a virtual machine module 102 based on an application program to be run and control the virtual machine module 102 to execute the codes of the application program;

the virtual machine module 102 is configured to call the storage management module 103 to respectively load application program codes and JIT compilation results of the bootup process of the application program into a memory, search in the JIT compilation results for local JIT compiled codes corresponding to the bootup process code segment to be executed, and execute the found local JIT compiled codes when executing each bootup process code segment of the application program;

the storage management module 103 is configured to store and read application program codes and JIT compilation results obtained from the JIT compilation of the bootup process of the application program, wherein the JIT compilation results include JIT compiled codes corresponding to each bootup process code segment that is JIT compiled.

During the specific implementation, the bootup device for the application program on a mobile equipment may further comprise a JIT compiler module 104, wherein:

the virtual machine module 102 is further configured to notify the JIT compiler module 104 to JIT compile a bootup process code segment to be executed, and interpretively execute the bootup process code segment to be executed when no local JIT compiled codes corresponding to the bootup process code segment to be executed are found in the JIT compilation results;

the JIT compiler module 104 is configured to JIT compile the bootup process code segment to be executed according to the notification of the virtual machine module 102, when confirming that there is free space in the memory space allocated on configuration of the virtual machine module 102.

Specifically, after receiving the notification of the virtual machine module, the JIT compiler module inquires whether there is still enough space to store the compiled codes of the bootup process code segment to be executed in the memory space allocated when the virtual machine module 102 is configured, if there is enough space, the JIT compiler module will JIT compile the bootup process code segment to be executed; otherwise, the bootup process code segment to be executed is abandoned.

Specifically, the application management module 101 is further configured to obtain the identification information of the application program to be run, transfer the obtained identification information of the application program to the virtual machine module 102 upon booting up the virtual machine module 102, and control, via the identification information of the application program, the virtual machine module to execute the application program codes; the virtual machine module 102 is further configured to call, according to the identification information of the application program, the storage management module 103 to respectively load the application program codes and the JIT compilation results of the bootup process of the application program into the memory; then obtain a first bootup process code segment of the application program; search in the JIT compilation results for local JIT compiled codes corresponding to the first bootup process code segment to be executed currently, execute the found local JIT compiled codes when the local JIT compiled codes corresponding to the code segment is found, notify the JIT compiler module to JIT compile the code segment, that is to be executed currently, of the application program when no local JIT compiled codes corresponding to the code segment is found, and execute the code segment interpretively; when the bootup process of the application program does not execute end, determine, according to the execution result of this code segment, a bootup process code segment, that is to be executed next, of the application program, and return to execute the last step until the bootup process of the application program executes end.

During the specific implementation, the bootup process code segment involved in the embodiments of the disclosure may include one segment of codes or a plurality of segments of codes specifically depending on the JIT compiler supported by the system executing the application program. Specifically, when the virtual machine module searches for the JIT compilation results in the JIT compilation result files and executes the JIT compiled codes corresponding to the code segment, after the execution of the JIT compiled codes completes, it means that a segment of codes beginning with the codes has been executed, the next segment of codes to be executed may be decided by the executed compilation results.

During the specific implementation, the identification information of the application program may include a software package name and a program name of the application program and the like.

During the specific implementation, the application management module 101 may be further configured to, after confirming that the execution of the bootup process of the application program ends, determine whether JIT compilation is performed during the execution of the bootup process of the application program, if so, obtain the JIT compiled codes corresponding to the bootup process of the application program from the JIT compiler module 104 and transfer the obtained JIT compiled codes to the storage management module 103, wherein the storage management module 103 may be configured to store the received JIT compiled codes of the bootup process of the application program in a specified external storage.

Specifically, after receiving the JIT compiled codes of the bootup process code segment in the bootup process of the application program, the storage management module 103 stores the JIT compiled codes in an external storage in a certain format.

Preferably, the application program involved in the embodiments of the disclosure may be a Java application program or another application program developed using other interpretive languages with the JIT compilation mechanism.

Particularly, due to various limitations of JIT implementation art such as limitation of memory capacity, codes involved in the bootup process of the application program may not be compiled entirely; instead, they are compiled only partially; the embodiments of the disclosure are also applicable to such a case.

Preferably, in the embodiments of the disclosure, the format of the JIT compilation results stored by the storage manager may be a table, as shown in Table 1; the keyword of the table is the position of the JIT compiled bootup process codes of the application program in the application program codes, and the content of the table is the storage position of the local JIT compiled codes obtained from the JIT compilation of the bootup process codes of the application program. When the involved code segment consists of a plurality of pieces of codes, the position of the first piece of codes of the compiled code segment in the application program codes is used as the keyword to inquire the storage position of the local JIT compiled codes. Therefore, the compilation results corresponding to the code address in the compilation result table may be not only the compilation results of this code, but also the compilation results of a segment of codes beginning with this code.

TABLE 1

| Keyword | Content |
| --- | --- |
| 100 | Storage position of local codes |
| 340 | Storage position of local codes |
| ... | ... |
| 800 | Storage position of local codes |

As shown in Table 1, when the keyword is 100, it means that the content is the storage position of the local JIT compiled codes obtained from the JIT compilation of the bootup process codes beginning with the position of 100 in the codes of the application program; similarly, when the keyword is 340, it means that the content is the storage position of the local JIT compiled codes obtained from the JIT compilation of the bootup process codes beginning with the position of 340 in the codes of the application program; when the keyword is 800, it means that the content is the storage position of the local JIT compiled codes obtained from the JIT compilation of the bootup process codes beginning with the position of 800 in the codes of the application program.

During the specific implementation, the reason that the JIT compilation results are stored by way of a table is because that, in such a way, it is easier to search for the codes of the bootup process of the application program to be executed and the corresponding JIT compilation results, and it is easy to maintain in such a way, which is also a common way of storage.

During the specific implementation, the application management module 101 may be further configured to notify the virtual machine module 102 after confirming that the execution of the bootup process of the application program ends; the virtual machine module 102 is further configured to determine, after confirming that the execution of the bootup process of the application program ends, whether JIT compilation is performed during the execution of the bootup process of the application program, if so, obtain JIT compiled codes corresponding to the bootup process of the application program from the JIT compiler module 104 and transfer the obtained JIT compiled codes to the storage management module 103; and the storage management module 103 is specifically configured to store the received JIT compiled codes of the bootup process of an application program in a specified external storage.

During the specific implementation, the application management module 101 is further configured to notify the JIT compiler module 104 after confirming that the execution of the bootup process of an application program ends; the JIT compiler module 104 is further configured to determine, after learning that the execution of the bootup process of an application program ends, whether JIT compilation is performed during the execution of the bootup process of the application program, and if so, transfer the JIT compiled codes to a storage management module 103; and the storage management module 103 is further configured to store the received JIT compiled codes of the bootup process of the application program in a specified external storage.

Based on the above device, the embodiments of the disclosure further provide a bootup method for an application program on a mobile equipment, as the principle of solution of the method is similar to that of the bootup device for an application program, implementation of the method may refer to that of the device without further elaboration.

FIG. 2 illustrates a flow diagram of a bootup method for an application program on a mobile equipment in the embodiments of the disclosure, as shown in FIG. 2, the method comprises the following steps:

S201: An application management module boots up a virtual machine module based on an application program to be run and controls the virtual machine module to execute codes of the application program;

S202: The virtual machine module calls a storage management module to respectively load the application program codes and JIT compilation results of the bootup process of the application program into a memory, searches in the JIT compilation results for local JIT compiled codes corresponding to the bootup process code segment to be executed, and executes the found local JIT compiled codes in execution of each bootup process code segment of the application program.

During the specific implementation, the bootup method for an application program on a mobile equipment may further include:

the virtual machine module notifies the JIT compiler module to JIT compile the bootup process code segment to be executed when no local JIT compiled codes corresponding to the bootup process code segment to be executed are found in the JIT compilation results, and executes the bootup process code segment to be executed interpretively; and the JIT compiler module JIT compiles the bootup process code segment to be executed according to the notification of the virtual machine module, when confirming that there is free space in the memory space allocated on configuration of the virtual machine module.

Specifically, the application management module obtains the identification information of an application program to be run, wherein the identification information may include the program name of the application program and software package name; boots up the virtual machine module and simultaneously transfers the obtained identification information to the virtual machine module, and controls, with the identification information, the virtual machine module to execute the application program codes. The virtual machine module calls, according to the identification information of the application program transferred from the application management module, the storage management module to respectively load application program codes and JIT compilation results of the bootup process of the application program into the memory; the virtual machine module obtains the first bootup process code segment of the application program to be executed, and uses the obtained code segment as the code segment to be executed currently; the virtual machine module finds the local JIT compiled codes corresponding to the code segment and determines whether there is any JIT compilation result for the code segment to be executed currently, if there is, the virtual machine module executes the found local JIT compiled codes; otherwise the virtual machine module notifies the JIT compiler module to JIT compile the bootup process code segment to be executed currently, and simultaneously executes the code segment interpretively. The application management module determines whether the execution of the bootup process of the application program ends, if not, the virtual machine module determines, according to the execution result of the code segment, a bootup process code segment of an application program to be executed next, and uses it as the code segment to be executed currently, and returns to execute the above process of determining whether there is any JIT compilation result for the bootup process code segment to be executed currently, until the application management module confirms that the execution of the bootup process of the application program ends.

During the specific implementation, the application management module determines, after confirming that the execution of the bootup process of an application program ends, whether JIT compilation is performed during the execution of the bootup process of the application program, if so, obtains the JIT compiled codes corresponding to the bootup process of the application program from the JIT compiler module, and transfers the obtained JIT compiled codes to the storage management module; the storage management module stores the received JIT compiled codes of the bootup process of the application program in a specified external storage.

Specifically, the JIT compilation results may be stored in the same external storage, or in different external storages.

During the specific implementation, the application management module may also notify the virtual machine module after confirming that the execution of the bootup process of an application program ends; the virtual machine module determines, after confirming that the execution of the bootup process of the application program ends, whether JIT compilation is performed during the execution of the bootup process of the application program, if so, obtains from the JIT compiler module the JIT compiled codes corresponding to the bootup process of the application program, and transfers the obtained JIT compiled codes to the storage management module, which stores the received JIT compiled codes of the bootup process of the application program in the specified external storage.

During the specific implementation, the application management module may also notify the JIT compiler module after confirming that the execution of the bootup process of the application program ends; the JIT compiler module determines, after learning that the execution of the bootup process of an application program ends, whether JIT compilation is performed during the execution of the bootup process of the application program, if so, transfers the JIT compiled codes to the storage management module, which then stores the received JIT compiled codes of the bootup process of the application program in the specified external storage.

Preferably, the application program involved in the embodiments of the disclosure may be a Java application program.

Specifically, when the application program involved in the embodiments of the disclosure is a Java application program, the bootup method for a Java application program on a mobile equipment belongs to a performance improvement method of platform type, which does not require modification of any Java application program and is applicable to all application programs developed on basis of Java on a mobile equipment, wherein involved mobile equipments include Mobile Internet Devices (MID), MP4 (MPEG-4, Moving Picture Expert Group-4), Play Station Portable (PSP), mobile phone, and the like.

To understand the way of implementation of the embodiments of the disclosure better, the way of implementation of the disclosure will be described below with specific embodiments. The embodiment of the disclosure is described taking as an example a software platform of an Android mobile phone, the application programs of which are developed with Java language, and the virtual machine thereof has the JIT function. FIG. 3 illustrates a logic structure diagram of a bootup device for a Java application program in an Android mobile phone software platform, as shown in the figure, in the Android mobile phone software platform, the application management module is divided into two software module entities: activity manager service and activity thread, wherein ActivityManagerService runs in a separate system progress, and ActivityThread runs in the application program progress; the JIT compiler module corresponds to one thread software module entity that runs in the application program progress; the storage management module package manager and the Java virtual machine module have corresponding software mould entities such as function/category, respectively, and at the same time they both run in the main thread of the application program progress.

In the embodiment of the disclosure, description will be given taking an activity in the Android mobile phone software platform as an example. In Android, an activity may be regarded as one Java application program, and the display of the first window of the activity indicates the completion of the bootup of the activity. In the embodiment of the disclosure, the JIT compilation results are stored as a table in the specific external storage.

Figure 4:
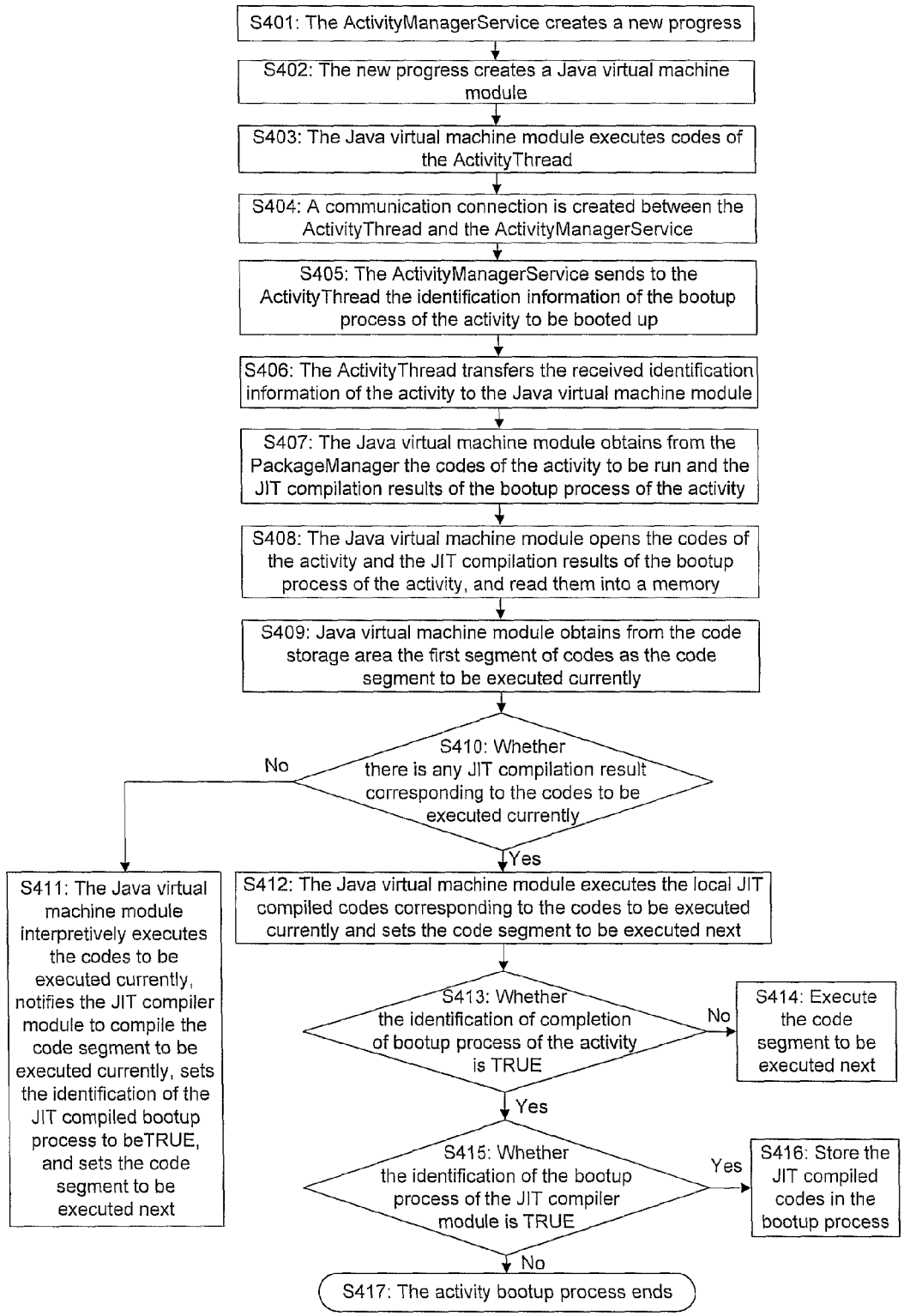
FIG. 4 illustrates a flow diagram of a bootup method for an activity in an Android mobile phone platform software in embodiments of the disclosure.

As shown in FIG. 4, a flow diagram of a bootup method for an activity in an Android mobile phone software platform is illustrated, wherein the method includes:

S401: The ActivityManagerService creates a new progress to run an activity.

S402: The new progress creates a Java virtual machine module.

S403: The Java virtual machine module executes codes of the ActivityThread.

S404: A communication connection is created between the ActivityThread and the ActivityManagerService.

S405: The ActivityManagerService sends to the ActivityThread the identification information of the bootup process of the activity to be booted up;

specifically, the indication information of the bootup process of the activity sent by the ActivityManagerService to the ActivityThread includes the name of the activity and the name of the software package, etc.

S406: The ActivityThread transfers the received identification information of the activity to the Java virtual machine module.

S407: The Java virtual machine module obtains from the PackageManager the codes of the activity to be run and the JIT compilation results of the bootup process of the activity.

S408: The Java virtual machine module opens the codes of the activity and the JIT compilation results of the bootup process of the activity, and read them into a memory;

Then the Java virtual machine module stores the codes of the activity and the JIT compilation results of the bootup process of the activity into the code storage area and the JIT-cache storage area (JIT cache) respectively;

Specifically, the PackageManager reads the JIT compilation results of the bootup process of the activity from the specified external storage, and the Java virtual machine module reads the JIT compilation results into the memory.

S409: Java virtual machine module obtains from the code storage area the first segment of codes as the code segment to be executed currently.

S410: The Java virtual machine module confirms whether there is any JIT compilation result corresponding to the code segment to be executed currently, if so, executes S412, and otherwise executes S411;

specifically, the Java virtual machine module uses the storage position of the code segment to be executed currently in the codes of the activity as the keyword to search for the JIT compilation results in the JIT-cache storage area, when the keyword has corresponding content, the content is a pointer pointing to the storage of the local JIT compiled codes obtained from the JIT compilation of codes to be executed currently; the local JIT compiled codes corresponding to the codes to be executed currently can be obtained according to the pointer.

S411: The Java virtual machine module interpretively executes the codes to be executed currently, notifies the JIT compiler module to compile the code segment to be executed currently, sets the identification of the JIT compiled bootup process to be TRUE, and sets the code segment to be executed next.

S412: The Java virtual machine module executes the local JIT compiled codes corresponding to the code segment to be executed currently and sets the code segment to be executed next.

S413: The ActivityManagerService confirms whether the identification of completion of bootup process of the activity is TRUE, if so, executes S415, and otherwise executes S414.

S414: execute the code segment to be executed next and return to execute S410;

as the code segment to be executed next will be set, which is guaranteed by the JIT compilation mechanism and the Java virtual machine mechanism, after the execution of codes to be executed currently is completed in S411 or S412, the set code segment to be executed next is taken as the code segment to be executed currently.

S415: The ActivityManagerService determines whether the identification of the bootup process of the JIT compiler module is TRUE, if so, executes S416, and otherwise executes S417.

S416: store the JIT compiled codes in this bootup process;

the ActivityManagerService obtains from the JIT compiler module the compiled codes that are JIT compiled in this bootup process of the activity and transfers the compiled codes to the PackageManager, which stores the compiled codes as a table under the installation directory of the activity.

S417: The activity bootup process ends.

In the embodiment of the disclosure, by improvement of the JIT mechanism, the code segment executed in the bootup process of a Java application program can be JIT compiled into local JIT compiled codes, and the JIT compilation results may be stored, breaking through the biggest performance bottleneck of the bootup process of the Java application program and increasing the bootup speed of the Java application program.

According to the bootup device and method for an application program on a mobile equipment provided in embodiments of the disclosure, during the bootup process of the application program, an application management module boots up, based on the application program to be run, a virtual machine module; and the virtual machine module calls a storage management module to respectively load codes of the application program and JIT compilation results of the bootup process of the application program into a memory, searches, in the JIT compilation results, for local JIT compiled codes corresponding to the bootup process code segment to be executed, and executes the found local JIT compiled codes when executing each bootup process code segment of the application program. Thus, when the application program is booted up, as the JIT compilation results of the bootup process code segment to be executed currently of the bootup process of the application program are saved, it only requires to directly execute the corresponding JIT local compilation results without the need to interpretively execute the bootup process code segment to be executed, so that the bootup speed of the application program is increased.

Obviously, persons skilled in the field may make various alterations and variations to the disclosure without departing from the spirit and scope of the disclosure. In this way, if these alterations and variations of the disclosure are within the scope of the claims and equivalent techniques thereof, the disclosure is also intended to encompass these alterations and variations.

What is claimed is:

1. A bootup device for an application program, the bootup device being located on a mobile equipment, comprising: an application management module, a virtual machine module, a JIT compiler module, and a storage management module connected to an external storage; wherein the application management module is configured to boot up a virtual machine module based on the application program to be run, and control the virtual machine module to execute codes of the application program;

the virtual machine module is configured to call the storage management module to respectively load the codes of the application program and Just in Time (JIT) compilation results of a bootup process of the application program into a memory, and search for, in the JIT compilation results, local JIT compiled codes corresponding to the code segment of the bootup process to be executed and execute the found local JIT compiled codes in execution of a code segment of the bootup process of the application program, so that the bootup speed of the application program is increased;

the virtual machine module is further configured to notify, when no local JIT compiled codes corresponding to the code segment of the bootup process to be executed is found in the JIT compilation results, the JIT compiler module to JIT compile the code segment of the bootup process to be executed, and interpretively execute the code segment of the bootup process to be executed;

the JIT compiler module is configured to JIT compile, according to the notification of the virtual machine module, the code segment of the bootup process to be executed when confirming that there is remaining memory space in the virtual machine module; and the storage management module is configured to store and read the codes of the application program and the JIT compilation results obtained from JIT compilation of the bootup process of the application program, wherein the JIT compilation results comprise JIT compiled codes corresponding to a JIT compiled code segment of the bootup process; and at the end of the execution of the bootup process of the application program, when it is determined that JIT compilation is performed during the execution of the bootup process of the application program, to store the JIT compiled codes corresponding to the bootup process of the application program in the external storage.

2. The device according to claim 1, wherein the application management module is further configured to obtain identification information of the application program to be run, transfer the obtained identification information of the application program to the virtual machine module when booting up the virtual machine module, and control, according to the identification information of the application program, the virtual machine module to execute the codes of the application program; the virtual machine module is further configured to call, according to the identification information of the application program, the storage management module to respectively load the codes of the application program and the JIT compilation results of the bootup process of the application program into the memory; obtain a first code segment of the bootup process of the application program; search for, in the JIT compilation results, local JIT compiled codes corresponding to the first code segment of the bootup process to be executed, execute the found local JIT compiled codes corresponding to the first code segment of the bootup process to be executed when it is found, notify the JIT compiler module to JIT compile the first code segment to be executed of the application program when no local JIT compiled codes corresponding to the first code segment is found, and execute the first code segment interpretively; when the execution of the bootup process of the application program does not end, determine, according to an execution result of the first code segment, a code segment of the bootup process of the application program to be executed next, and return to execute a preceding step until the execution of the bootup process of the application program ends.

3. The device according to claim 1, wherein the application management module is further configured to determine, after confirming that the execution of the bootup process of the application program ends, whether JIT compilation is performed during the execution of the bootup process of the application program, if so, obtain JIT compiled codes corresponding to the bootup process of the application program from the JIT compiler module, and transfer the obtained JIT compiled codes to the storage management module;

the storage management module is configured to store the received JIT compiled codes corresponding to the bootup process of the application program in the external storage.

4. The device according to claim 1, wherein the application management module is further configured to notify the virtual machine module after confirming that the execution of the bootup process of the application program ends;

the virtual machine module is further configured to determine, after learning that the execution of the bootup process of the application program ends, whether JIT compilation is performed during the execution of the bootup process of the application program, if so, obtain JIT compiled codes corresponding to the bootup process of the application program from the JIT compiler module, and transfer the obtained JIT compiled codes to the storage management module;

the storage management module is specifically configured to store the received JIT compiled codes corresponding to the bootup process of the application program in the external storage.

5. The device according to claim 1, wherein the application management module is further configured to notify the JIT compiler module after confirming that the execution of the bootup process of the application program ends;

the JIT compiler module is further configured to determine, after learning that the execution of the bootup process of the application program ends, whether JIT compilation is performed during the execution of the bootup process of the application program, if so, transfer the JIT compiled codes to the storage management module;

the storage management module is configured to store the received JIT compiled codes corresponding to the bootup process of the application program in the external storage.

6. The device according to claim 1, wherein the application program is a Java application program.

7. A bootup method for an application program on a mobile equipment, comprising:
  booting up, by an application management module, a virtual machine module based on the application program to be run, and controlling the virtual machine module to execute codes of the application program;
  calling, by the virtual machine module, a storage management module to respectively load the codes of the application program and Just in Time (JIT) compilation results of a bootup process of the application program into a memory, and searching for, in the JIT compilation results, local JIT compiled codes corresponding to a code segment of the bootup process to be executed and executing the found local JIT compiled codes in execution of the code segment of the bootup process of the application program, so that the bootup speed of the application program is increased;
  notifying, by the virtual machine module, a JIT compiler module to JIT compile the code segment of the bootup process to be executed when no local JIT compiled codes corresponding to the code segment of the bootup process to be executed is found in the JIT compilation results, and interpretively executing the code segment of the bootup process to be executed;
  JIT compiling, by the JIT compiler module, according to the notification of the virtual machine module, the code segment of the bootup process to be executed when confirming that there is remaining memory space in the virtual machine module; and
  at the end of the execution of the bootup process of the application program, when it is determined that JIT compilation is performed during the execution of the bootup process of the application program, storing, by the storage management module, the JIT compiled codes corresponding to the bootup process of the application program in an external storage.

8. The method according to claim 7, wherein the step of booting up, by the application management module, the virtual machine module based on the application program to be run, and controlling the virtual machine module to execute the codes of the application program is as follows:
  obtaining, by the application management module, identification information of the application program to be run, transferring the obtained identification information of the application program to the virtual machine module when booting up the virtual machine module, and controlling, according to the identification information of the application program, the virtual machine module to execute the codes of the application program.

9. The method according to claim 8, wherein execution steps of the bootup process of the application program are as follows:
  calling, by the virtual machine module, according to the identification information of the application program, the storage management module to respectively load the codes of the application program and the JIT compilation results of the bootup process of the application program into the memory;
  obtaining, by the virtual machine module, a first code segment of the bootup process of the application program;
  searching for, by the virtual machine module, in the JIT compilation results, local JIT compiled codes corresponding to the first code segment of the bootup process to be executed, executing the found local JIT compiled codes corresponding to the first code segment of the bootup process to be executed when it is found, notifying the JIT compiler module to JIT compile the first code segment of the application program to be executed when no local JIT compiled codes corresponding to the first code segment is found, and executing the first code segment interpretively;
  determining, by the application management module, whether the execution of the bootup process of the application program ends, if not, determining, by the virtual machine module, according to an execution result of the first code segment, a code segment, to be executed next, of the bootup process of the application program, and returning to execute a preceding step until the application management module confirms that the execution of the bootup process of the application program ends.

10. The method according to claim 7, further comprising:
  after confirming that the execution of the bootup process of the application program ends, determining, by the application management module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
  storing, by the storage management module, the received JIT compiled codes corresponding to the bootup process of the application program in the external storage.

11. The method according to claim 7, further comprising:
  notifying, by the application management module, the virtual machine module after confirming that the execution of the bootup process of the application program ends;
  after learning that the execution of the bootup process of the application program ends, determining, by the virtual machine module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
  storing, by the storage management module, the received JIT compiled codes corresponding to the bootup process of the application program in the external storage.

12. The method according to claim 7, further comprising:
  notifying, by the application management module, the JIT compiler module after confirming that the execution of the bootup process of the application program ends;
  after learning that the execution of the bootup process of then application program ends, determining, by the JIT compiler module, whether JIT compilation is performed during the execution of the bootup process of the application program, if so, transferring the JIT compiled codes to the storage management module;
  storing, by the storage management module, the received JIT compiled codes corresponding to the bootup process of the application program in the external storage.

13. The method according to claim 7, wherein the application program is a Java application program.

14. The device according to claim 2, wherein
  the application management module is further configured to determine, after confirming that the execution of the bootup process of the application program ends, whether JIT compilation is performed during the execution of the bootup process of the application program, if so, obtain JIT compiled codes corresponding to the bootup process of the application program from the JIT compiler module, and transfer the obtained JIT compiled codes to the storage management module;

the storage management module is configured to store the received JIT compiled codes corresponding to the bootup process of the application program in the external storage.

15. The device according to claim 2, wherein
the application management module is further configured to notify the virtual machine module after confirming that the execution of the bootup process of the application program ends;
the virtual machine module is further configured to determine, after learning that the execution of the bootup process of the application program ends, whether JIT compilation is performed during the execution of the bootup process of the application program, if so, obtain JIT compiled codes corresponding to the bootup process of the application program from the JIT compiler module, and transfer the obtained JIT compiled codes to the storage management module;
the storage management module is specifically configured to store the received JIT compiled codes corresponding to the bootup process of the application program in the external storage.

16. The device according to claim 2, wherein
the application management module is further configured to notify the JIT compiler module after confirming that the execution of the bootup process of the application program ends;
the JIT compiler module is further configured to determine, after learning that the execution of the bootup process of the application program ends, whether JIT compilation is performed during the execution of the bootup process of the application program, if so, transfer the JIT compiled codes to the storage management module;
the storage management module is configured to store the received JIT compiled codes corresponding to the bootup process of the application program in the external storage.

17. The method according to claim 8, further comprising:
after confirming that the execution of the bootup process of the application program ends, determining, by the application management module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
storing, by the storage management module, the received JIT compiled codes corresponding to the bootup process of the application program in the external storage.

18. The method according to claim 9, further comprising:
after confirming that the execution of the bootup process of the application program ends, determining, by the application management module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
storing, by the storage management module, the received JIT compiled codes corresponding to the bootup process of the application program in the external storage.

19. The method according to claim 8, further comprising:
notifying, by the application management module, the virtual machine module after confirming that the execution of the bootup process of the application program ends;
after learning that the execution of the bootup process of the application program ends, determining, by the virtual machine module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
storing, by the storage management module, the received JIT compiled codes corresponding to the bootup process of the application program in the external storage.

20. The method according to claim 9, further comprising:
notifying, by the application management module, the virtual machine module after confirming that the execution of the bootup process of the application program ends;
after learning that the execution of the bootup process of the application program ends, determining, by the virtual machine module, whether JIT compilation is performed during the execution of the bootup process of the application program, if so, obtaining JIT compiled codes corresponding to the bootup process of the application program from the JIT compiler module, and transferring the obtained JIT compiled codes to the storage management module;
storing, by the storage management module, the received JIT compiled codes corresponding to the bootup process of the application program in the external storage.

21. The method according to claim 8, further comprising:
notifying, by the application management module, the JIT compiler module after confirming that the execution of the bootup process of the application program ends;
after learning that the execution of the bootup process of then application program ends, determining, by the JIT compiler module, whether JIT compilation is performed during the execution of the bootup process of the application program, if so, transferring the JIT compiled codes to the storage management module;
storing, by the storage management module, the received JIT compiled codes corresponding to the bootup process of the application program in the external storage.

22. The method according to claim 9, further comprising:
notifying, by the application management module, the JIT compiler module after confirming that the execution of the bootup process of the application program ends;
after learning that the execution of the bootup process of then application program ends, determining, by the JIT compiler module, whether JIT compilation is performed during the execution of the bootup process of the application program, if so, transferring the JIT compiled codes to the storage management module;
storing, by the storage management module, the received JIT compiled codes corresponding to the bootup process of the application program in the external storage.

* * * * *